W. M. SCARBOROUGH.
ILLUMINATED LENS SIGN.
APPLICATION FILED OCT. 2, 1913.
1,104,008.
Patented July 21, 1914.
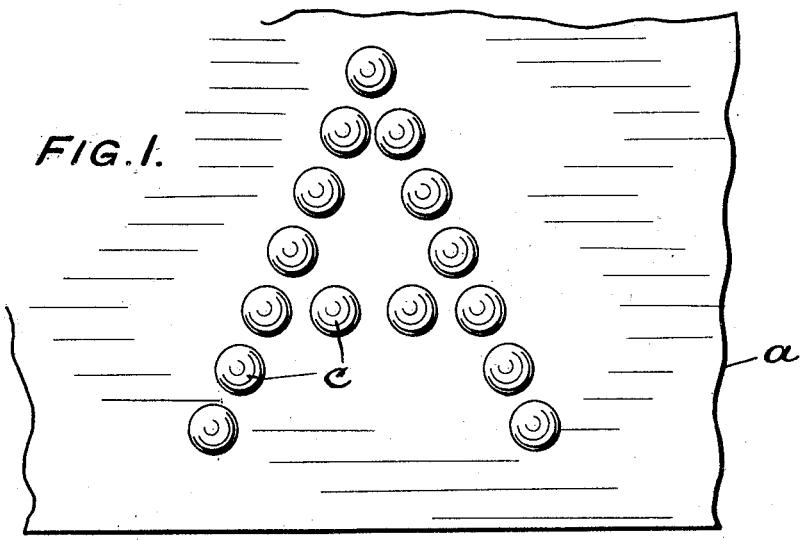
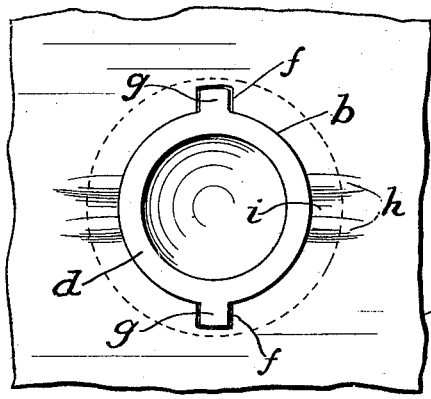
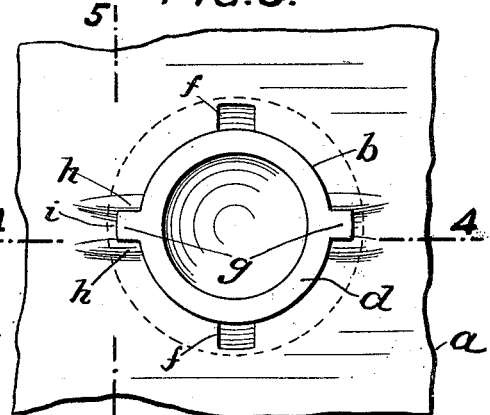
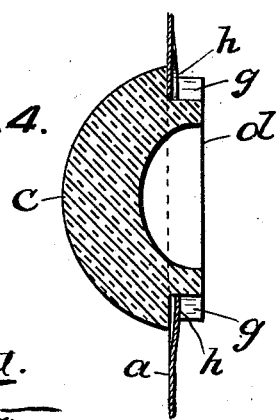
WITNESSES:
INVENTOR
Walter M. Scarborough
BY Frank S. Busser
ATTORNEY.

UNITED STATES PATENT OFFICE.

WALTER M. SCARBOROUGH, OF LANCASTER, PENNSYLVANIA.

ILLUMINATED-LENS SIGN.

1,104,008.

Specification of Letters Patent.

Patented July 21, 1914.

Application filed October 2, 1913. Serial No. 792,955.

*To all whom it may concern:*

Be it known that I, WALTER M. SCARBOROUGH, a citizen of the United States, residing at Lancaster, county of Lancaster, and State of Pennsylvania, have invented a new and useful Improvement in Illuminated-Lens Signs, of which the following is a full, clear, and exact description, reference being had to the accompanying drawings, which form a part of this specification.

My invention relates to that form of sign composed of a metal sheet casing containing illuminating lamps and provided with orifices in which are inserted glass lenses, the orifices and lenses being arranged to form outlines of letters or other characters.

Heretofore various means have been employed for inserting the lenses in the orifices. They have been fastened in place by cement and other adhesives; by shoulders, grooves, lugs, etc., on the lenses coöperating with notches, lugs, tongues, etc., at the margins of the orifices, sometimes associated with wire or washers arranged between the lugs and plate; by screw threads of different forms on the shanks of the lenses coöperating with notches or slits in the margins of the orifices; and by other means. These securing means are open to various objections. The lenses can be secured in place with difficulty and their insertion requires the exercise of some skill and the expenditure of considerable time; the lenses are often broken in the attempt to force them in place; the face plate is distorted where a screw thread is used; permanently tight joints are not always secured, and the lenses sometimes work loose and drop out; and the manufacture of the face plates and lenses equipped with the necessary securing means involves considerable expense.

The objects of my invention are to enable the face plates and lenses to be manufactured at a minimum of expense; to enable the lenses to be secured in place with expedition and by unskilled workmen; to avoid breakage of the lenses and distortion of the face plate; and to provide a permanently tight joint so that the lenses cannot work loose or out of position.

I will first describe a preferred embodiment of my invention and will then point out in the claims the essential features thereof.

In the drawings: Figure 1 is a front view of a face plate with lenses in position; Fig. 2 is an enlarged rear view of the face-plate and one of the lenses showing the initial position of the lens in the operation of fastening it in position on a face plate; Fig. 3 is a similar view showing the lens in final position on the face plate; Figs. 4 and 5 are enlarged cross-sections on the lines 4—4 and 5—5 respectively of Fig. 3.

The face plate $a$ of the sign is provided with circular orifices $b$ arranged to form the desired letter or character. The lens is composed of a rounded head $c$ and a shank $d$ of somewhat less diameter than the extreme diameter of the head, thereby forming an annular shoulder $e$ on the under or inner side of the head surrounding the shank. These features are old and well known, being common to illuminated lens signs.

At one or more points along the margin of each orifice $b$ is formed one or more notches $f$, in the face plate $a$, each notch opening into the orifice. Preferably there are two notches, diametrically opposite one to the other. On the shank $d$ of the corresponding lens is formed one or more lugs $g$. Preferably there are two lugs, diametrically opposite one to the other, each of which is shaped, in cross section, to conform to the shape of the corresponding notch and is of a size enabling it to just pass through said notch. The space between the top of the lug and the shoulder $e$ is substantially greater than the thickness of the plate. At another point or points in the face plate adjacent to the margin of the orifice $b$ are formed one or more cams $h$ $i$ $h$. Preferably there are two of these cams, located diametrically opposite to each other, each cam being midway between the two notches. Preferably each cam is formed by upsetting the metal adjacent to the margin of the orifice so as to form a pair of radially extending ridges $h$, $h$, separated by a depression $i$. The said ridges are raised to such height above the level of the inner face of the face plate that one or the other of them (dependent upon the direction in which the lens is turned) will contact with the face of the lug $g$ opposite the shoulder $e$ and offer resistance to its further turning, but not sufficient resistance to prevent the lug turning beyond it and settling in the depression $i$, which is also preferably raised above the level of the face plate but not so high above it as the ridges $h$, $h$. It may be desirable to make the engaging face of the lug slightly convex in contour, which will aid in allowing the lug, or the apex thereof, to ride over the ridge.

To apply the lens to the face plate the same is brought opposite the orifice in which it is to be secured, with the lugs g alined with the notches f. The shank may thus be passed into the orifice until the shoulder of the head rests against the face plate. This brings the top of the face of the lug opposite the shoulder e beyond the plane of the inner or under side of the face plate. The lens may then be freely turned on its axis until the lugs g contact with two diametrically opposite ridges h. The workman continues to turn, against the resistance of the ridges, until the lugs override the ridges and settle in the depressions i. When the lugs are thus engaged with the depressions, the lens remains fixed in position, but even if the ridges are so formed as to permit a limited turning movement of the lugs between the ridges, they cannot turn beyond them except by using the degree of manual force required to bring the lens into operative position.

I have found, by careful experiment, that a lens so fastened in place will hold with absolute security. It cannot accidentally turn away, to any substantial degree, from the position in which it has been secured, and certainly cannot accidentally work around to the point where the lug exactly alines with the notch. The lens may be secured in place expeditiously by a boy or other unskilled workman; there is no danger of breakage of the lens; the face plate remains absolutely unweakened; and the expense of manufacture is slight.

Having now fully described my invention, what I claim and desire to protect by Letters Patent is:

1. A sign comprising a face plate of sheet metal containing a substantially circular orifice having a notch in the margin thereof, a lens having a head and a shank of smaller diameter than the part of the head adjacent thereto, thus forming an annular shoulder surrounding the shank on the under face of the head, a lug formed on the side of the shank and spaced from the shoulder, and a cam on the inner or under face of the plate adapted to frictionally engage the lug, whereby the shank may be inserted in the orifice by registering the lug with the notch and the lens secured in frictional engagement with the face plate by turning the lens to bring the lug into frictional contact with the cam.

2. A sign comprising a face plate of sheet metal containing a substantially circular opening having a notch in the margin thereof, a lens having a head and a shank of smaller diameter than the part of the head adjacent thereto, thus forming an annular shoulder surrounding the shank on the under face of the head, and a lug formed on the side of the shank and spaced from the shoulder, the face plate being upset to form a ridge on its inner or under face adapted, after the lens has been inserted in the orifice and turned on its axis, to frictionally engage the lug.

3. A sign comprising a face plate of sheet metal containing a substantially circular opening having a notch in the margin thereof, a lens having a head and a shank of smaller diameter than the part of the head adjacent thereto, thus forming an annular shoulder surrounding the shank on the under face of the head, and a lug formed on the side of the shank and spaced from the shoulder, the face plate being upset to form, on its inner or under face, a pair of radially extending ridges separated by a depression, said depression coöperating with the lug to prevent or limit the turning of the lens after the same has been secured in position.

4. A sign comprising a face plate of sheet metal containing a substantially circular opening having a notch in the margin thereof, a lens having a head and a shank of smaller diameter than the part of the head adjacent thereto, thus forming an annular shoulder surrounding the shank on the under face of the head, a lug formed on the side of the shank and spaced from said shoulder, and a cam on the inner or under face of the face plate comprising a pair of ridges separated by a depression, said cam coöperating with said lug to secure the lens in position on the face plate.

In testimony of which invention, I have hereunto set my hand, at Lancaster, on this 29th day of September, 1913.

WALTER M. SCARBOROUGH.

Witnesses:
CHAS. E. LONG,
EDWARD T. BRANDON.